(12) United States Patent
Koch et al.

(10) Patent No.: US 6,464,403 B1
(45) Date of Patent: Oct. 15, 2002

(54) OPTICAL CONNECTOR

(75) Inventors: Beat Koch; Thomas Schmalzigaug, both of Schweiz (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 09/890,415

(22) PCT Filed: Feb. 12, 1999

(86) PCT No.: PCT/CH99/00064

§ 371 (c)(1),
(2), (4) Date: Jul. 30, 2001

(87) PCT Pub. No.: WO00/48030

PCT Pub. Date: Aug. 17, 2000

(51) Int. Cl.[7] ................................................. G02B 6/36
(52) U.S. Cl. ........................... 385/53; 385/72; 385/139; 439/357; 439/484
(58) Field of Search ............................... 385/55–60, 62, 385/66, 70–72, 77, 78, 81, 84, 87, 139; 439/352–357, 489, 484

(56) References Cited

U.S. PATENT DOCUMENTS

| | | |
|---|---|---|
| 5,673,346 A | 9/1997 | Iwano et al. |
| 5,930,426 A | 7/1999 | Harting et al. |

FOREIGN PATENT DOCUMENTS

| | | |
|---|---|---|
| DE | 19619374 | 8/1997 |
| EP | 0430107 | 4/1996 |

*Primary Examiner*—Khiem Nguyen
(74) *Attorney, Agent, or Firm*—Tarolli, Sundheim, Covell, Tummino & Szabo L.L.P.

(57) ABSTRACT

The invention relates to an optical connector for detachably connecting a circuit board to a backplane. The inventive connector comprises at least one plug (10A) and at least one socket (10B) for receiving the plug (10A), whereby the socket (10B) comprises an outer housing (12) and an inner housing (13). Said inner housing (13) is mounted in the outer housing (12) such that it can be displaced in the direction of plug insertion, and a locking means (25,26) prevents the inner housing from being displaced inside the outer housing (12). In addition, unlocking means (20) are assigned to the plug (10A) which unlock the first locking means (25,26) when the plug (10A) is completely inserted into the socket (10B). Second locking means (20,21,23,24) are assigned to the plug (10A) which interlock said plug (10A) and socket (10B) when the plug (10A) is completely inserted. The aim of the invention is to obtain a compact construction and to increase the versatility of the plug system. To this end, the second locking means are configured such that they simultaneously serve as unlocking means for the first locking means.

10 Claims, 7 Drawing Sheets

OPTICAL CONNECTOR

BACKGROUND INFORMATION

Figure 1:
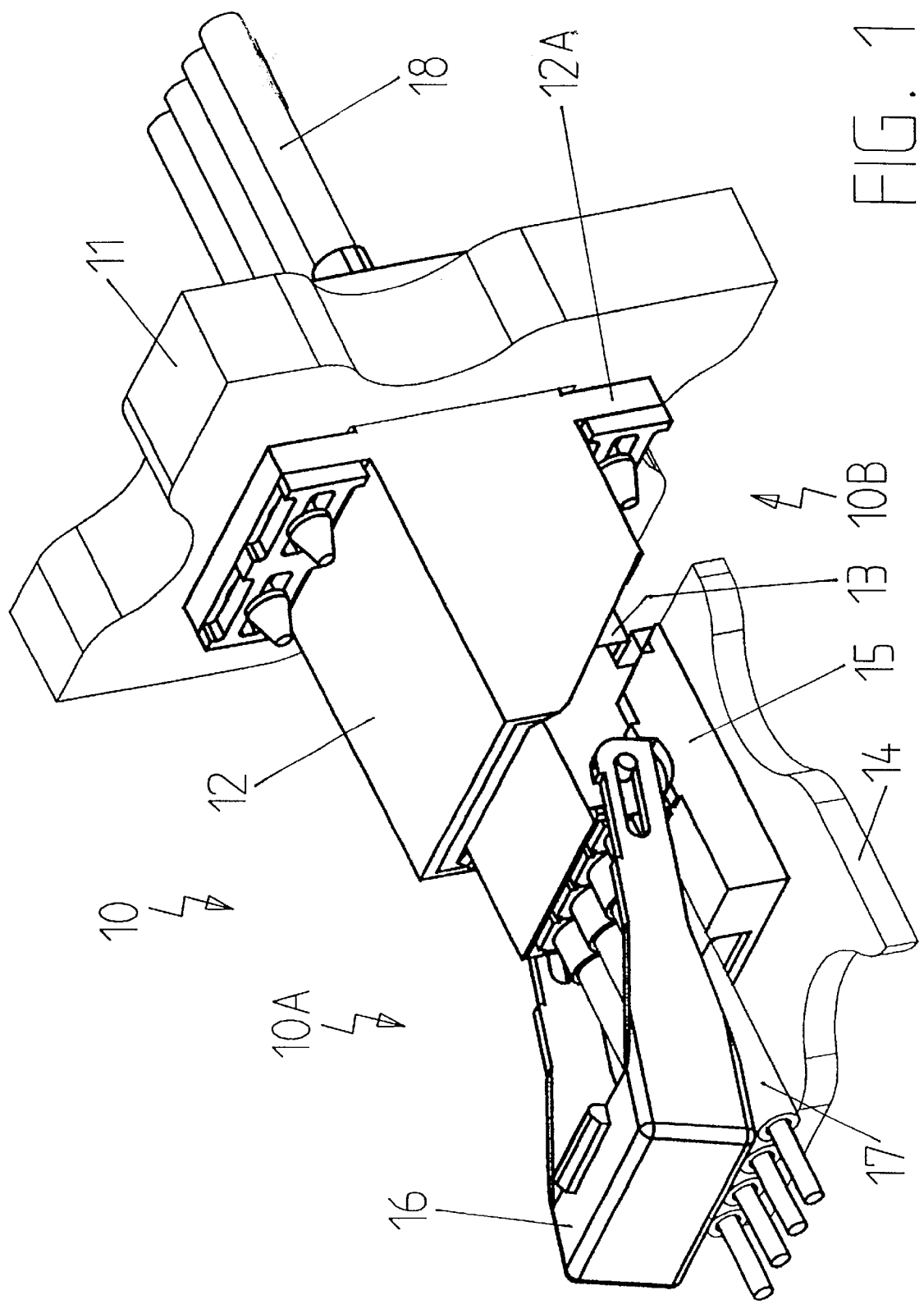

The present invention relates to the field of optical fiber technology. It relates to an optical connector for detachable connection of a circuitboard ("board") to a mounting rear wall ("backplane") according to the definition of the species of claim 1.

Such a connector is known from German Patent 196 19 374 C1, for example.

STATE OF THE ART

When combining individual circuitboards ("boards") to form an overall system in which the boards are designed to be individually pluggable and are interconnected functionally by plugging them into a mounting rear wall ("backplane") or they may be connected functionally to signal inputs or outputs, there is also a growing demand for fiber optic plug-and-socket connections and connectors for optical fibers by means of which not only electric signals but also optical signals can be exchanged between the individual boards and the backplane. Since defined pressing forces of the abutting fiber end faces must be maintained with such a fiber optic plug-and-socket connection, comparatively high occur, in particular when a plurality of individual fiber optic connections must be established per board with the connector at the same time; unless special measures are taken, these forces can act on the backplane, causing deformation which then makes individual connections unserviceable. In addition, it is important to be able to compensate for the changes in length which necessarily occur when a plurality of plugs are used per board. At the same time, however, measures must be taken to ensure that the connection is secured to prevent the plug and socket from coming apart after being connected.

European Patent 430,107 B1, in particular FIGS. 3(a) through 3(j) there and the respective parts of the description, has already proposed a fiber optic connector, where an inner housing 36 on the socket end is mounted in an outer housing 34 so it is displaceable in the direction of plug insertion. When fully inserted, the inner housing is prevented from moving relative to the outer housing by a first locking mechanism in the form of a first snap clip or a catch tongue 38 and a first catch step 37. An unlocking element 41 provided on the plug end unlocks the first locking mechanism when the plug is inserted into the socket, thus ensuring free displaceability of the plug-and-socket connection inside the outer housing after insertion. The first locking mechanism and the respective unlocking element are accommodated at the side, namely on one side of the connector.

A second locking mechanism comprising a second snap clip 40 arranged on the plug and a respective second catch step 39 arranged on the inner housing causes the plug to be engaged and locked with the inner housing when inserted into the socket and permits it to move together with the inner housing relative to the outer housing in the direction of plug insertion. The second locking mechanism is also arranged at the side, but on the other side of the connector. In this case, the plug is fixedly connected to the backplane while the outer housing of the socket part is fixedly mounted on the board.

However, there are various disadvantages to the two locking mechanisms arranged at the side, acting independently of one another. For a proper plug insertion process, it is important for the two locking mechanisms to be operated (locked or unlocked) in a certain sequence, as illustrated in detail in FIGS. 3(a) through 3(j) of the aforementioned publication. However, since the two locking mechanisms are arranged on opposite sides of the connector and function independently of one another, there is the danger that the proper operating sequence might not be guaranteed any longer in insertion due to skewing of the plug.

However, the bilateral arrangement of the locking mechanisms is especially unfavorable with respect to flexible modular use of the connector with a freely selectable number of individual fiber optic connections, because lateral expandability in a fixed, predetermined grid spacing is impossible. German Patent 196 19 374 C1, the document mentioned above, also disclosed a plug-and-socket connection for optical fibers arranged together with electric plug-and-socket connections on a circuitboard which can be inserted into a frame, where the tolerances predetermined by the electric plug-and-socket connections are compensated by the fact that the half of the plug-and-socket connection for optical fibers arranged in the frame has a plug part which is held and locked in a carrying body. This lock is released when the halves of the plug-and-socket connection are joined, and instead a locking engagement is formed with the second half of the plug-and-socket connection of the circuitboard, so the plug part is held displaceably in the carrying body due to the fact that the locking engagement with the carrying body is released.

The detachable engagement is accomplished here by an interaction between two spring arms 9 that are integrally molded in one piece on the plug part, their front ends being provided with inclined faces and catch shoulders, and two (rigid) catch arms 28 integrally molded on a mounting part secured on the circuitboard. However, such an engagement and disengagement mechanism requires a complicated movement operation in insertion and accordingly a complex design in terms of the geometry and arrangement of the individual catch elements.

EXPLANATION OF THE INVENTION

Therefore, the object of this invention is to create an optical connector which avoids the disadvantages of the known connector and ensures synchronized operation of the locking mechanisms, especially with a compact design, and permits a flexible modular manufacturing design with regard to the individual fiber connections.

This object is achieved through the totality of features of claim 1. The core of this invention consists of the fact that the first locking means comprise a first snap clip provided on the inner housing, extending in the direction of plug insertion, and in the locked state it snaps behind a first locking shoulder arranged on the outer housing; the socket comprises an outer housing and an inner housing, where said inner housing is mounted displaceably in the direction of plug insertion and is secured to prevent displacement within the outer housing by means of the first locking means; the minimum of one plug comprises a body having a plug-in part; the second locking means comprise a second snap clip which is mounted on the body and extends in the direction of plug insertion, and in the locked state, it snaps behind a second locking shoulder arranged on the inner housing of the socket; and the two snap clips are designed and arranged so that the second snap clip snaps first behind the second locking shoulder on insertion of the plug, and then the first snap clip is lifted above the first locking shoulder and is thereby unlocked.

The solution according to this invention is characterized by a simple design and reliable functioning and can be manufactured advantageously with the means of the injection molding technology. The second locking means which are provided for mutual locking of the plug and socket are also used at the same time for unlocking the first locking means which lock the inner housing in the outer housing in the case of the socket. In this way, a forced synchronization of the two locking and unlocking operations is achieved. At the same time, both of the locking mechanisms can be accommodated compactly on the same side; so that the opposite side is freely accessible and is not subject to any restrictions. It is selfevident that the inner housing can be designed to be displaceable in the outer housing in the case of either the bushing or the plug without any change in effect.

It is especially advantageous if according to a first preferred embodiment of this invention, the first and second locking means are arranged on the side of the connector facing the circuitboard or facing away from it. This does not result in any restrictions laterally on either side of the connector with regard to a space-saving alignment of a plurality of connectors in a row side by side. In addition, in this way, the locking means can be brought very close to the longitudinal axis of the connector, so that the pressing forces originating from the ends of the optical fibers, acting on the longitudinal axis, yield a very small locking moment which does not cause any wedging.

According to another preferred embodiment of this invention, a secure and low-friction interaction between the two snap clips is achieved by the fact that the two snap clips have parallel inclined faces on their free ends which cause a deflection of the first snap clip across the direction of plug insertion when the snap clips come in contact on insertion of the plug.

Figure 2:
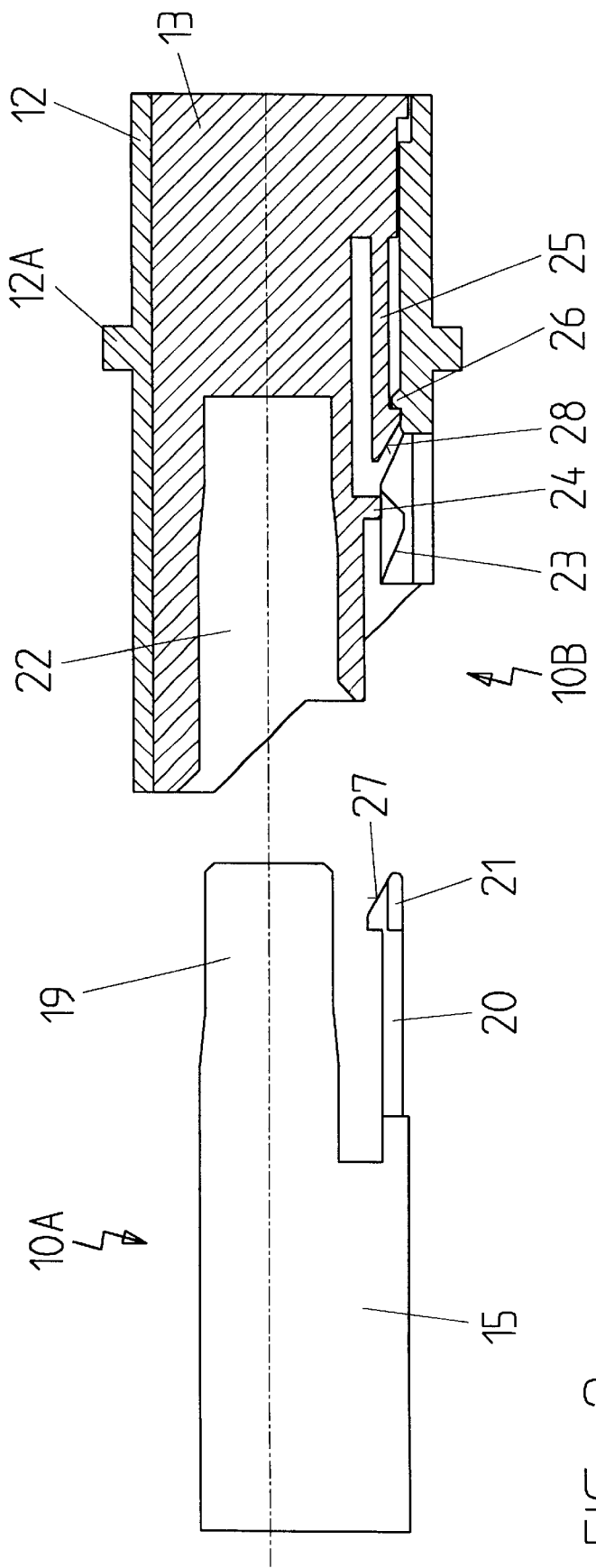

FIG. 1 shows a perspective view of a preferred embodiment of an optical connector according to this invention, shown with the plug inserted. In the present example, the connector 10 detachably connects four fiber optic cables 17 arranged in series on a circuitboard ("board") 14 to four corresponding optical cables 18 which lead outward away from a backplane 11. Board 14 is arranged at a right angle to backplane 11. connector 10 comprises a plug 10A fixedly mounted on the edge of board 11 and a socket 10B which fits the plug and has an inner housing 13 which is mounted so it can be displaced in the direction of plug insertion in an outer housing 12. The outer housing 12 is secured by means of a flange 12A in an opening in the backplane 11 (e.g., by screw connection). The plug 10A has a body 15 which develops into an plug-in part 19 at one end, as indicated in FIG. 2. With this plug-in part 19 it is inserted into an insertion opening 22 (FIG. 2) in socket 10B. The plug 10A and the ends of the fiber optic cables 17 in it can be protected from damage or soiling by a safety flap 16 which is pivotably mounted on the body 15 and is pivoted backward before insertion; this also secures it against unintentional leakage of radiation.

The locking means arranged inside connector 10 are not visible in FIG. 1, but the preferred embodiment and functioning are to be explained in greater detail below on the basis of FIGS. 2 through 6, which relate to different phases of the plug insertion process. FIG. 2 shows the connector from FIG. 1 in a simplified, partially cutaway side view before insertion of the plug. The fiber optic cables and the details of the optical connection between the cables have been omitted for reasons of simplicity.

Locking means provided on the plug 10A end comprise a snap clip 20 and are used for locking between the body 15 and the inner housing 13. Snap clip 20 is arranged at a distance beneath the plug-in part 19. It is preferably integrally molded on the body 15 of the plug 10A and extends in the direction of plug insertion, i.e., parallel to the plug-in part 19. It is the same length as or slightly shorter than the plug-in part 19, so that it is largely protected from mechanical damage by the plug-in part 19. Due to its tongue-like design, the snap clip 20 can be deflected elastically across the direction of plug insertion, and with its free hook-shaped end, it can snap behind a locking shoulder 24 which is provided for this purpose on the inner housing 13 of the socket. The deflectability of the snap clip 20 downward which is required for the locking effect is guaranteed by the fact that the plug 10A with its body 15 is attached to the edge of the board 14 so that the plug-in part 19 and the snap clip 20 project freely beyond the edge of the board.

Additional locking means which are provided on the side of the socket 10A for locking between the inner housing 13 and the outer housing 12 comprise another snap clip 25 and a respective locking shoulder 26. The snap clip 25 is integrally molded on the underside of the inner housing 13 and extends in the direction of plug insertion at a distance beneath the tapered front part of the inner housing 13. The locking shoulder 26 behind which the snap clip 25 can snap with its hook-shaped free end is integrally molded on the lower inside wall of the outer housing 12. the distance between the snap clip 25 and the underside of the inner housing 13 is selected so that the tongue-shaped snap clip 25 which can be deflected elastically across the direction of plug insertion can be deflected upward far enough for the hook-shaped end to come clear of the locking shoulder 26. In the state illustrated in FIG. 2, the two housings 12 and 13 are locked together by the snap clip 25, i.e., the inner housing 13 which is displaceable in the outer housing 12 cannot be shifted to the rear (to the right in FIG. 2).

Figure 3:
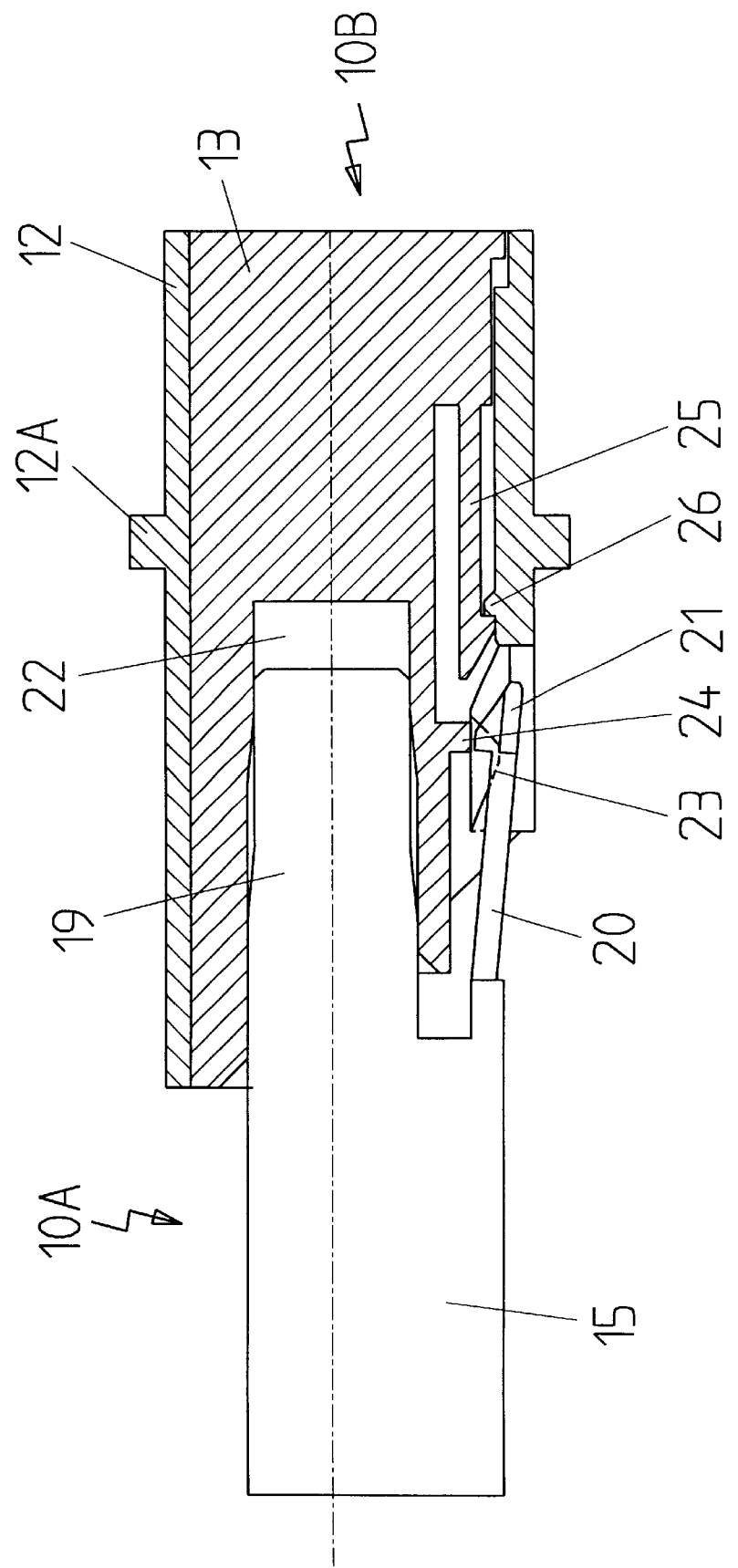

According to FIG. 3, the plug insertion operation begins with an initial phase during which the plug 10A together with the plug-in part 19 is inserted into the insertion opening in the socket to the extent that the snap clip 20 with its hook-shaped end moves over the locking shoulder 24. In this process, the snap clip 20 is deflected downward so that there is practically no contact between the snap clip 20 and the locking shoulder 24. This is achieved by means of one or more suitably shaped (trapezoidal) control paths 23 which are provided on the outer housing 12 at the level of the locking shoulder 24 and are scanned on insertion by the snap clip 20 with ears 21 projecting outward laterally on its hook-shaped end.

Figure 4:
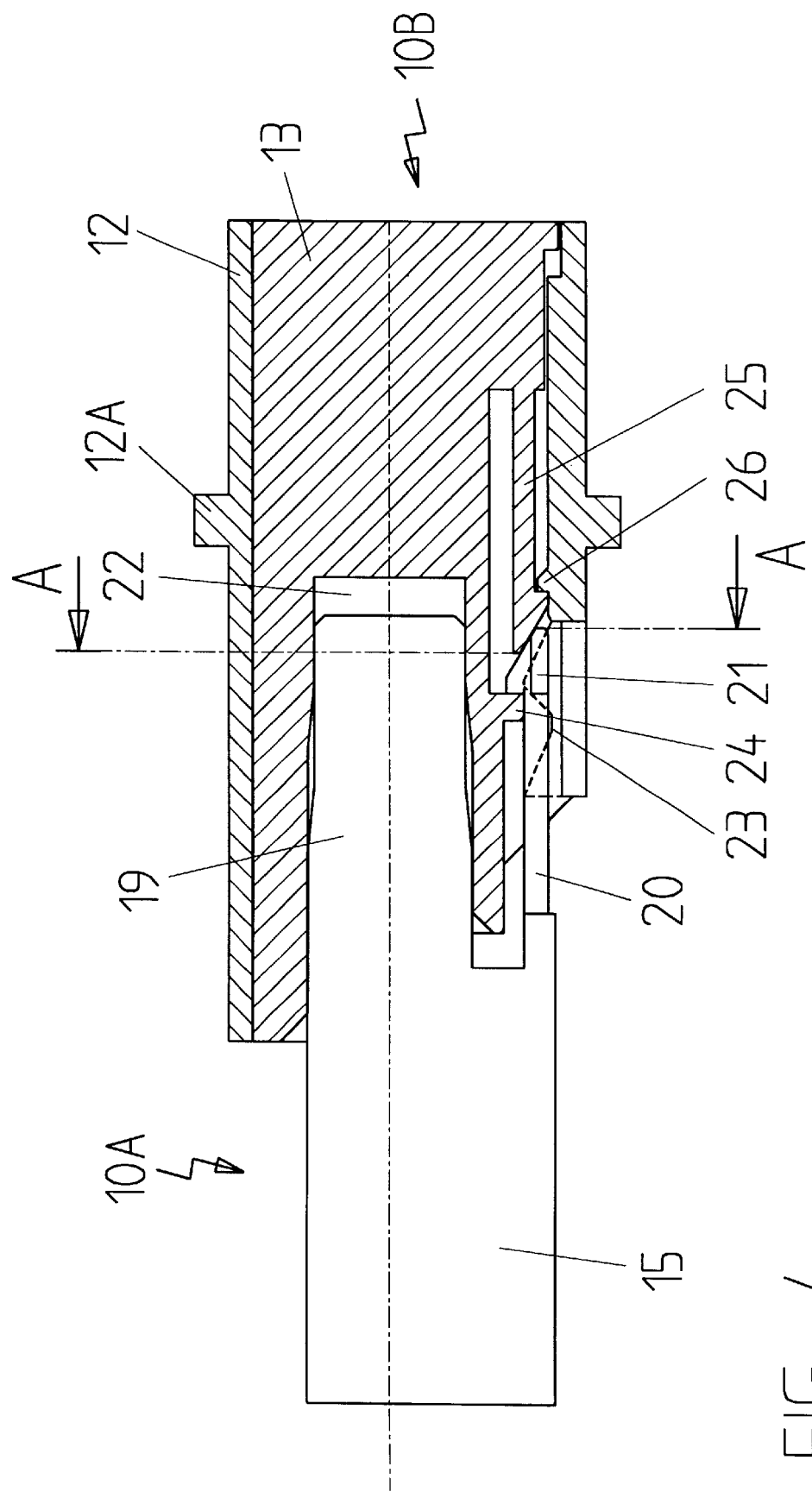
Figure 5:
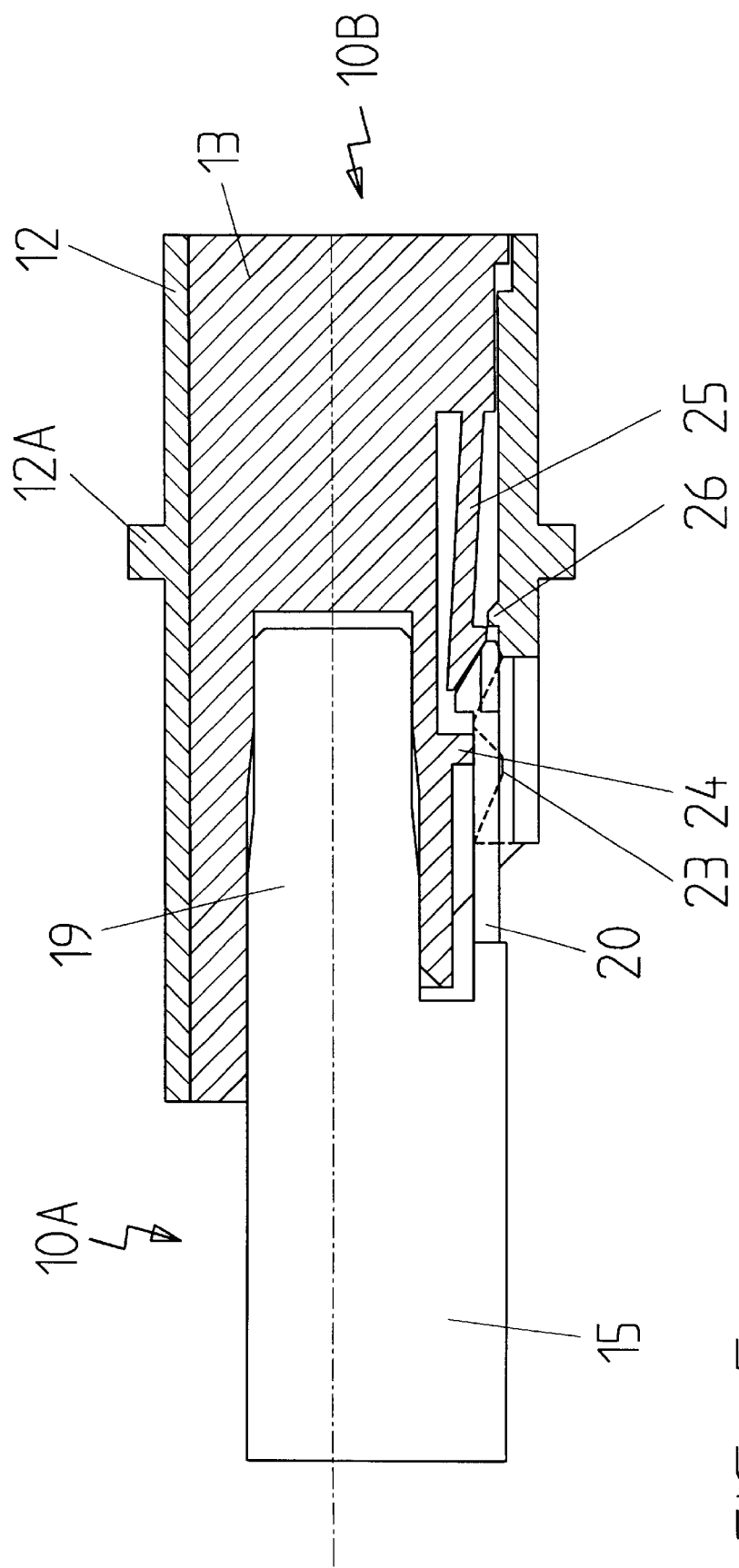
Figure 6:
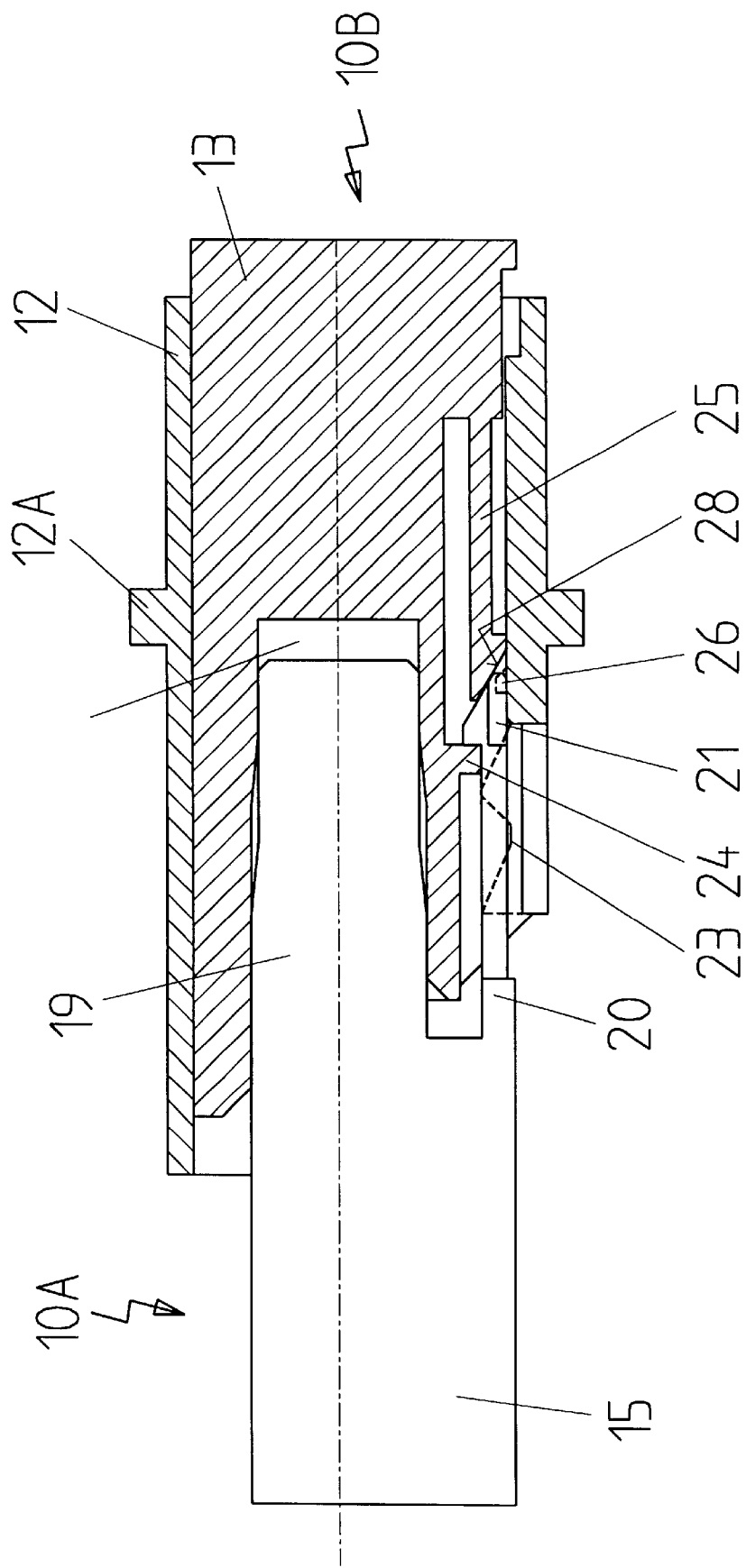

When the plug 10A is inserted further (FIG. 4), the snap clip 20 returns to its resting position on the rising inclination of the control path 23 because of the elastic restoring forces and thus snaps behind the locking shoulder 24. In this intermediate state, the plug 10A and the socket 10B are locked together while the inner housing 13 and the outer housing 12 are also locked together; then the connection between the optical fibers is already functional. As shown in FIG. 4, the locking shoulders 24 and 26 and the two snap clips 20 and 25 are shaped and arranged in such a way that immediately after the snap clip 20 is snapped behind the locking shoulder 24, the end face of this snap clip strikes the end face of the other snap clip 25. The two snap clips 20, 25 have parallel tapered edges 27, 28 on their free ends (end faces) (FIG. 2), so that with a further insertion of the plug 10A, the snap clip 25 is deflected upward across the direction of plug insertion, while snap clip 20 is supported at the bottom on the adjacent lower inside wall of the outer housing 12 and therefore is not deflected. In this way, the snap clip 25 is lifted upward by the snap clip 20 over the locking shoulder 26 and is thus unlocked (FIG. 5).

In the completely inserted state (FIG. 6), the inner housing 13 is freely displaceable in the outer housing 12 in the direction of plug insertion due to the unlocking of the snap clip 25, while the plug 10A is locked with the socket 10B or its inner housing 13. Plug 10A and inner housing 13 of the socket 10B can thus be displaced jointly (float) in the outer housing 12.

The unplugging operation proceeds in the opposite order. If, starting from the state in FIG. 6, the plug 10A is shifted to the left in the outer housing 12 together with the inner housing 13 of the socket 10B, then the snap clip 25 with its tapered edge 28 slides over the locking shoulder 26 (which is also tapered on the other side) and snaps behind it. If the unplugging operation is continued, the lateral ears 21 of the snap clip 20 scan the control path 23 in the opposite direction, so that this snap clip 20 is lifted above the locking shoulder 24 and comes free. The plug 10A can then be pulled out of the insertion opening 22 with no problem.

Figure 7:
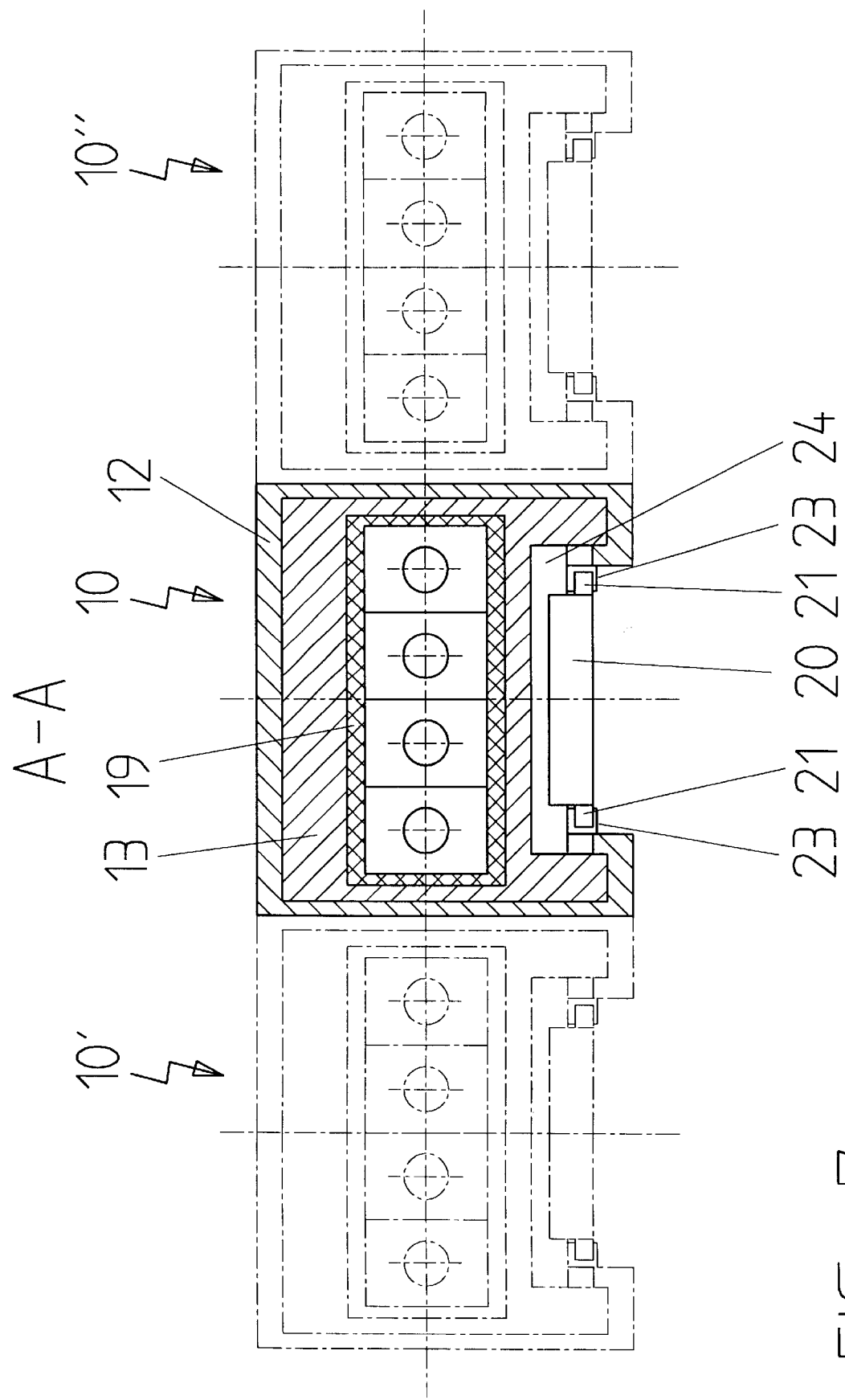

The compact design of the locking means in the solution according to this invention is shown especially clearly in the diagram in FIG. 7, which shows a cross section through the connector 10 in FIG. 4 in the plane A—A and two identical connectors 10' and 10" that are directly adjacent to one another on the two sides. It can be seen immediately here that the functionally interacting locking mechanisms arranged on the lower side of the connector 10, 10' and 10", of which only the snap clip 20 on the plug end, with the lateral ears 21, the locking shoulder 24 and the control paths 23 can be seen in FIG. 7, permit a very narrow and flat design of the connector. The space at the side and at the top is free for the actual end elements of the optical fibers and for other functions such as an opened dust protection cap. The lateral space is needed in particular for the end elements of the optical fibers, because with an increase in demand for the number of fibers, the largest possible number of elements are to be integrated along the board. The connectors (10, 10' and 10" in FIG. 7) can thus be lined up in a row side by side between the individual optical connections without any intermediate distance and without any great loss of space. It is especially important that they can be can be lined side by side if electric (LF or HF) connectors are mounted next to the optical connectors, e.g., according to the Metral system. The width of the optical connector corresponds to the width of the smallest module of the electric connector. Due to this modular design, a flexible side-by-side mounting of optical connectors and electric (LF or HF) connectors is guaranteed.

The placement of the locking means according to FIG. 7 in the perpendicular center plane directly beneath the longitudinal axis of the connector brings another advantage. The locking means are very close to the longitudinal axis of the plug and the socket. This guarantees that the pressing forces (acting on the lacquer containing the additive) which originate from the end elements of the optical fibers yield very small tilting moment which does not cause any wedging in the plug insertion operation.

Whereas one embodiment was described above on the basis of the figures, wherein the freedom from forces between the board and the backplane is established by means of an inner housing displaceably mounted in the outer housing, said inner housing being arranged on the socket end, instead of this the outer housing and displaceable inner housing can also be arranged with the same effect on the plug end within the scope of this invention, where the locking means are offset accordingly.

The solution according to this invention has the following particular characteristics or advantages on the whole:

A force is needed between the circuitboard ("board") and the mounting rear wall ("backplane") only during insertion of the plug. After locking the second locking means and after unlocking the first locking means, there is a freedom from forces after plug insertion. This prevents deformation of the board and the backplane.

The shallow design of the locking means makes it possible for the locking means to be mounted on only one side but very close to the longitudinal axis of the plug and the socket. The pressing forces (acting on the longitudinal axis) that originate from the end elements of the optical fibers thus yield only a very small tilting moment which does not cause any wedging.

The unilateral arrangement of the locking means keeps the space at the side and above free for the actual end elements of the optical fibers and for other functions. The space at the side is needed for the end elements of the optical fibers, because with an increase in demand for the number of fibers, the greatest possible number of elements are to be integrated along the board. The connectors can thus be lined up in rows side by side without any space between them and without any great loss of space between the individual optical connections.

The width of the optical connector corresponds to the width of the smallest module of the electric connector. Due to the identical modularity with the electric connectors (LF OR HF), such as Metral connectors, for example, the optical and electric connectors can be lined up side by side in rows in any desired manner and are thus more flexible.

Within this system, one to four fiber connections, for example, can be lined up side by side per connector.

The minimum number of snap clips per locking means keeps the insertion and extraction force low.

List of reference notation 10, 10', 10" optical connector ("backplane connector")
10A plug
10B socket
11 mounting rear wall ("backplane")
12 outer housing (socket)
12A flange
13 inner housing (socket)
14 circuitboard (board)
15 body (plug)
17, 18 safety flap (plug)
19 plug-in part
20, 25 snap clip
21 side ear
22 insertion opening
23 control path
24, 26 locking shoulder
27, 28 tapered edge

What is claimed is:
1. An optical connector (10) for detachable connection of a circuitboard ("board") (14) to a mounting rear wall ("backplane") (11), said connector (10) comprising at least one plug (10A) and at least one socket (10B) where the plug (10A) or the socket (10B) comprises an outer housing (12) and an inner housing (13), said inner housing (13) being mounted in the outer housing (12) so it is displaceable in the direction of plug insertion and is secured to prevent displacement within the outer housing (12) by means of a first locking means (25, 26), and unlocking means (20) are provided for the plug (10A) or the socket (10B), unlocking the first locking means (25, 26) when the plug (10A) is completely inserted into the socket (10B), and where second locking means (20, 21, 23, 24) are provided for the plug (10A) or the socket (10B), locking the plug (10A) and the socket (10B) together when the plug (10A) is completely inserted, where the second locking means (20, 21, 23, 24) are designed so that they also function as unlocking means for the first locking means (25, 26), and the first locking means (25, 26) comprise a first snap clip (25) which is provided on the inner housing (13) and extends in the direction of plug insertion, and in the locked state, it snaps behind a first locking shoulder (26) arranged on the outer housing (12), and the socket (10B) comprises an outer housing (12) and an inner housing (13), said inner housing (13) being mounted displaceably in the direction of plug insertion in the outer housing (12) and secured to prevent displacement within the outer housing (12) by means of the first locking means (25, 26), characterized in that the minimum of one plug (10A) comprises a body (15) having a plug-in part (19); the second locking means (20, 21, 23, 24) comprise a second snap clip (20) which is mounted on the body (15), extends in the direction of plug insertion, and in the locked state, snaps behind a second locking shoulder (24) provided on the inner housing (13) of the socket (10B); and the two snap clips (20, 25) are designed and arranged so that the second snap clip (20) snaps first behind the second locking shoulder (24) on insertion of the plug (10A), and then the first snap clip (25) is lifted above the first locking shoulder (26) and is thus unlocked.

2. The optical connector according to claim 1, characterized in that the first and second locking means (25, 26 and 20, 21, 23, 24) are arranged on the lower side of the connector (10) facing the circuitboard (14) or turned away from it.

3. The optical connector according to claim 1, characterized in that the first locking means (25, 26) comprise a first snap clip (25) which is provided on the inner housing (13) and extends in the direction of plug insertion, and in the locked state it snaps behind a first locking shoulder (26) arranged on the outer housing (12).

4. The optical connector according to claim 1, characterized in that the socket (10B) comprises an outer housing (12) and an inner housing (13), said inner housing (13) being mounted in the outer housing (12) displaceably in the direction of plug insertion and secured to prevent displacement within the outer housing (12) by means of the first locking means (25, 26).

5. The optical connector according to claim 4, characterized in that ears (21) are provided on the side at the free end of the second snap clip (20) for scanning the control path (23).

6. The optical connector according to one of claims 1 through 5, characterized in that a plurality of fiber optic cables (17, 18) are connected within the connector (10).

7. The optical connector according to claim 5, characterized in that a control path (23) is provided on the outer housing (12) at the level of the second locking shoulder (24) for locking and unlocking the second snap clip (20), so that with its free end, the second snap clip (20) slides along this control path on insertion and extraction of the plug (10A) and is lifted above the second locking shoulder (24).

8. The optical connector according to claim 7, characterized in that the outer housing (12) is equipped with a flange (12A) for mounting on the backplane (11).

9. The optical connector according to claim 1, characterized in that a plurality of fiber optic cables (17, 18) are connected within the connector (10).

10. The optical connector according to claim 1, characterized in that the socket (10B) is provided for assembly on a backplane (11) and the plug (10A) is provided for assembly on a circuitboard (14).

* * * * *